United States Patent
Mendenhall et al.

(10) Patent No.: US 6,978,595 B2
(45) Date of Patent: Dec. 27, 2005

(54) CHAIN LINKS AND CABLE CARRIER CHAINS CONTAINING SAME

(75) Inventors: Jefferson S. Mendenhall, New Castle, PA (US); John H. Bakker, Cortland, OH (US); Peter T. Bucco, Cortland, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/062,438

(22) Filed: Feb. 5, 2002

(65) Prior Publication Data

US 2003/0145575 A1 Aug. 7, 2003

(51) Int. Cl.[7] .............................................. F16G 13/02
(52) U.S. Cl. ............................ 59/78.1; 248/49; 59/900
(58) Field of Search ....................... 59/78, 78.1; 248/49, 248/51

(56) References Cited

U.S. PATENT DOCUMENTS

| | | | |
|---|---|---|---|
| 4,570,437 A | * | 2/1986 | Moritz ......................... 59/78.1 |
| 4,813,224 A | | 3/1989 | Blase |
| RE33,339 E | | 9/1990 | Heidrich et al. |
| 5,108,350 A | | 4/1992 | Szpakowski |
| 5,201,885 A | | 4/1993 | Wehler et al. |
| 5,334,111 A | | 8/1994 | Cole, Jr. et al. |
| 5,445,569 A | | 8/1995 | Blase |
| 5,649,415 A | | 7/1997 | Pea |
| 5,836,148 A | * | 11/1998 | Fukao ......................... 59/78.1 |
| 5,839,476 A | | 11/1998 | Blase |
| 5,860,274 A | | 1/1999 | Saleh et al. |
| 5,980,409 A | | 11/1999 | Blase |
| 5,987,873 A | | 11/1999 | Blase |
| 6,065,278 A | | 5/2000 | Weber et al. |
| 6,067,788 A | | 5/2000 | Weber |
| 6,107,565 A | * | 8/2000 | O'Rourke ................... 59/78.1 |
| 6,161,372 A | | 12/2000 | Wehler |
| 6,167,689 B1 | * | 1/2001 | Heidrich et al. ............. 59/78.1 |
| 6,174,020 B1 | | 1/2001 | Knettle et al. |
| 6,190,277 B1 | | 2/2001 | Blase |
| 6,318,063 B1 | * | 11/2001 | Komiya et al. .............. 59/78.1 |

* cited by examiner

Primary Examiner—David Jones
(74) Attorney, Agent, or Firm—David P. Wood

(57) ABSTRACT

A cable carrier chain having improved strength and flexibility (including improved bilateral flexibility) useful in automotive and other applications contains pivotally joined chain links, each link containing two side plates, two undercut pins, two round apertures which are slightly oversized relative to the pins, a hinged cover lid and a bottom support plate. In the chain, the undercut pins of one chain link are mated with the slightly oversized apertures of an adjacent link, giving the chain increased strength and flexibility. The cover lid preferably includes a hinge member having a relatively thin horizontal strap hinge disposed between two relatively thick vertical hinge straps. The bottom surface of the support plate preferably contains ribs which reduce noise and wear.

18 Claims, 3 Drawing Sheets

CHAIN LINKS AND CABLE CARRIER CHAINS CONTAINING SAME

BACKGROUND OF THE INVENTION

This invention relates to novel chain links and to improved cable carrier chains composed of such chain links. More particularly, this invention relates to novel chain links which impart increased strength and flexibility to cable carrier chains composed of the chain links.

A cable carrier chain is a sheath designed to protect and route wires or cables in a moving application. More particularly, a cable carrier chain is an articulating sheath designed to protect and guide electrical/fiberoptic cables that are attached at one end to a fixed body and at the other end to a laterally moving body, the cable carrier chain protecting and guiding the cables while the moving body cycles throughout its full range of positions.

A cable carrier chain is composed of links that bend through a range of positions. For use in automotive and industrial applications, a robust cable carrier chain must permit repeated bilateral cycling under torsional and tension loads under various environmental conditions without the decoupling of the links that comprise the chain. An automotive cable carrier chain must also be designed to minimize noise during cycling of the chain and when the chain is at rest when it is subject to normal vehicle vibration and shock while the vehicle is in motion. Due to high volume usage of an automotive cable carrier chain, the links of the chain must be designed to aid in automated cable carrier assembly.

Cable carrier chains are known in the art. Reference is made, for example, to U.S. Pat. Nos. 4,813,224; 5,108,350; 5,201,885; 5,334,111; 5,445,569; 5,649,415; 5,839,476; 5,860,274; 5,980,409; 5,987,873; 6,065,278; 6,067,788; 6,161,372; 6,174,020; 6,190,277; 6,226,973; and U.S. Pat. No. RE 33,339.

Although cable carrier chains are known, it is continually desirable to provide cable carrier chains which exhibit improved strength, flexibility (particularly bilateral flexibility) and ease of assembly, and reduced abrasion and noise created by link-to-track contact.

A particularly desired feature not currently found in cable carrier chains is increased strength and flexibility in a small package size.

Another drawback to currently produced cable carrier chains is that they are not designed to guide cables in a bilateral motion under a torsional load. Instead, such cable carrier chains are designed for unilateral motion under tension loads only. For example, one commercially available cable carrier chain has a straight-walled (as opposed to undercut), rounded pin mating to an elliptical aperture. Mating of the elliptical aperture and the rounded pin do not allow for a large surface area to be in contact between the links. This feature only allows for half of the corner edge of the aperture to be in contact with half of the pin at one time. As a result, the chain will decouple or break when subjected to torque during bilateral motion. The use of the rounded pin also yields to decoupling because there are no flat opposing surfaces in contact with each other. Therefore, the pin can be pulled through the elliptical aperture and decoupling can occur without the pin failing. Furthermore, the mating of the straight-walled pin to an elliptical retaining wall allows for minimal flexibility before the chain links will decouple.

Another disadvantage of cable carrier chains currently produced for industrial application are disadvantageous in that they do not have an outside geometry designed to reduce noise when in use or at rest. Currently produced cable carriers have flat bottoms and do not have any provisions made to the outside geometry to reduce the contact area between the link and the track, thereby allowing extensive noise and abrasion from the track due to normal vehicle use.

A further drawback to conventional cable carrier chains is that they are currently produced for a single specific industrial application and are hand assembled. To be easily assembled in an application requiring mass production, the links of the cable carrier chain must be in their open position, allowing them to flex. Therefore, steps must be taken in the design of the chain links to prevent them from closing during the assembly process. This is currently not being done due to the lack of mass produced cable carrier chains.

Thus, a primary object of this invention is to provide chain links for use in a cable carrier chain wherein the links provide the chain with increased strength and flexibility.

A further object of this invention is to provide chain links for use in a cable carrier chain wherein the links provide the chain with increased strength and flexibility in a small package size.

A still further object of this invention is to provide chain links for use in a cable carrier chain wherein the chain links do not decouple when the chain is guiding cables in a bilateral motion under a torsional load, thus providing the chain with good bilateral flexibility.

Another object of this invention is to provide chain links for use in a cable carrier chain wherein the chain links each have an outside geometry designed to reduce abrasion and noise created by link-to-track contact while the chain is in use and while the chain is at rest.

Still another object of this invention is to provide chain links for use in cable carrier chains, wherein the links are configured so that the chains are relatively easy to assemble.

A further object of this invention is to provide a cable carrier chain composed of chain links which have the properties set forth in the preceding objects.

These and other objects are achieved in the present invention.

SUMMARY OF THE INVENTION

The present invention provides a novel chain link and an improved cable carrier chain composed of a plurality of the chain links. The chain links impart to the cable carrier chain increased strength and flexibility in a small package size, a feature which is unmatched by current manufacturers of cable carrier chains.

The chain link of this invention contains: (1) laterally spaced first and second side plates, each of the plates having a first end and an opposite second end; (2) first and second undercut pins disposed on outer surfaces of the first ends of the first and second side plates, respectively; (3) first and second round apertures formed in the second ends of the first and second side plates, respectively; (4) a hinged cover lid disposed transversely between the first and second side plates; and (5) a bottom support plate transversely connecting the first and second side plates to one another. Each of the first and second undercut pins contains a cylindrical shaft, an annular head, and a flat undercut-portion. Each of the first and second round apertures is configured to receive an undercut pin which is identical in configuration and dimension to the first or second undercut pin. Thus, each of the apertures contains an inner pin-retaining wall having a configuration complementary to and slightly oversized relative to the undercut pin such that the pin is slidably retained within the aperture. The retaining wall contains: a flat first retaining-surface for slidable engagement with the undercut-portion of the pin, an annular second retaining-surface for slidable engagement with the shaft of the pin, and an annular third retaining-surface for slidable engagement with the head of the pin.

Preferably, the first and second undercut pins are axially aligned relative to one another, and the first and second apertures are axially aligned relative to one another.

The cable carrier chain of this invention is composed of a plurality of the aforementioned chain links pivotally joined in end-to-end fashion, wherein the undercut pins of one chain link are mated with the oversized apertures of a first adjacent chain link and the oversized apertures of the one chain link are mated to the undercut pins of a second adjacent chain link.

As stated previously herein, automotive and industrial cable carrier chains must be bilaterally flexible without the risk of decoupling or breaking. The cable carrier chain of this invention has increased strength and flexibility due to the undercut pins of a first chain link mating to oversized corresponding round apertures of a second, adjacent chain link. The mating of the undercut pins to the oversized round pin-retaining walls of the apertures gives the cable carrier chain of this invention increased strength and flexibility by increasing the amount of contact area between the pin and the retaining wall when the cable carrier chain is under both torsion and tension loads.

In addition, the mating of the undercut pin and the oversized pin-retaining wall of the aperture in the chain of this invention provides increased flexibility by allowing clearance between the head of the pin and the oversized retaining wall. Therefore, the mating of the undercut pins and the oversized retaining walls of the apertures greatly reduces the chance of link-decoupling during bilateral movement of the cable carrier chain when both torsion and tension loads are applied to the chain. This differs from existing cable carrier chains that have a straight-walled pin mating to an elliptical retaining wall, which only allows for minimal flexibility before the carrier links will decouple.

A mass produced cable carrier chain for use in automotive applications should be designed to aid in automated assembly. In a preferred embodiment of the chain link and chain of this invention, the cover lid in the chain link preferably includes a hinge member having a relatively thin horizontal strap hinge disposed between two relatively thick vertical hinge straps.

Such dual strap hinge member holds the chain links open during assembly to act as locating feature, and allows the links to flex. The dual strap hinge also acts as a backup hinge in case of primary hinge failure, thereby maintaining the strength and integrity of the cable carrier chain by not allowing the chain to buckle and decouple under torsional load. Existing cable carriers have only single strap hinges that do not hold the door open in a stable position prior to assembly, thus making automatic assembly of the part difficult. In the case of hinge failure, a single strap hinge has no secondary backup, thus allowing the chain links to buckle and decouple under torsional loads.

A cable carrier chain for use in automotive applications should be silent during cycling of the carrier chain and when the chain is at rest but undergoing shock and vibration caused by normal driving conditions. In a preferred embodiment of the chain link and chain of this invention, the bottom surface of the support plate preferably contains ribs which reduce noise and wear. More specifically, the ribs disposed on the bottom plate surface of the chain links of this invention reduce the amount of noise created by the cable carrier chain by decreasing the link-to-track contact area. These noise-reducing ribs also serve as an anti-wear feature by reducing the effects of abrasion to the cable carrier chain itself and the vehicle due to door cycling and vehicle vibration. As stated hereinabove, currently produced cable carriers have flat bottoms and do not have an outside geometry designed to reduce the contact area between the link and the track, thereby allowing much noise and abrasion from the track due to normal vehicle use.

The cable carrier chain of this invention can be used to guide and protect cables, wires and hoses in a variety of applications, including but not limited to automotive applications (e.g., sliding doors), industrial robots, automated machinery, mobile and construction equipment, medical lab equipment, and the like.

DETAILED DESCRIPTION OF THE INVENTION

As stated above, the present invention provides a novel chain link and a cable carrier chain comprising a plurality of the chain links.

The invention will be described with reference to FIGS. 1–5 herein.

Figure 1:
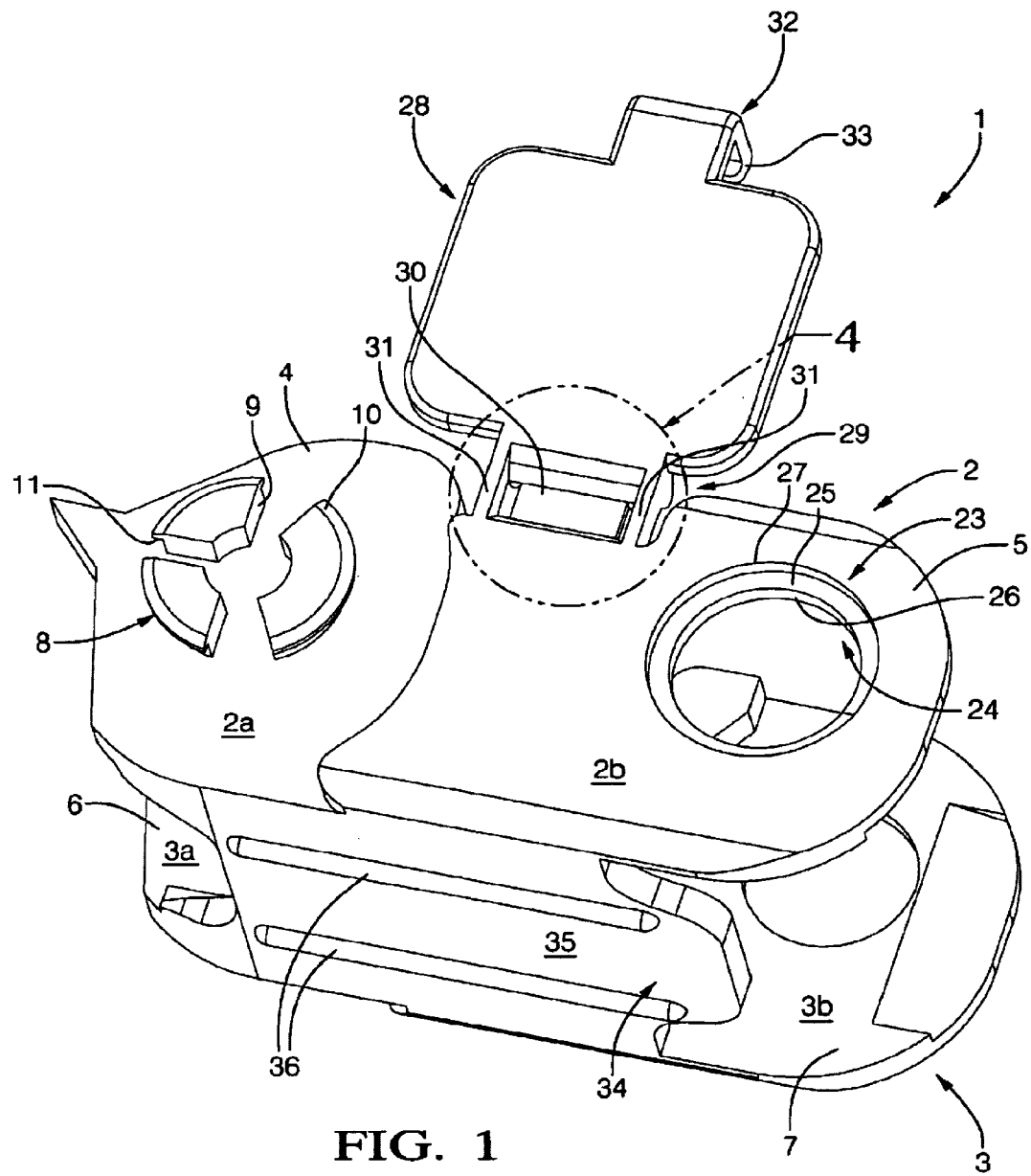
FIG. 1 is a top perspective view of a chain link of the present invention.
Figure 2:
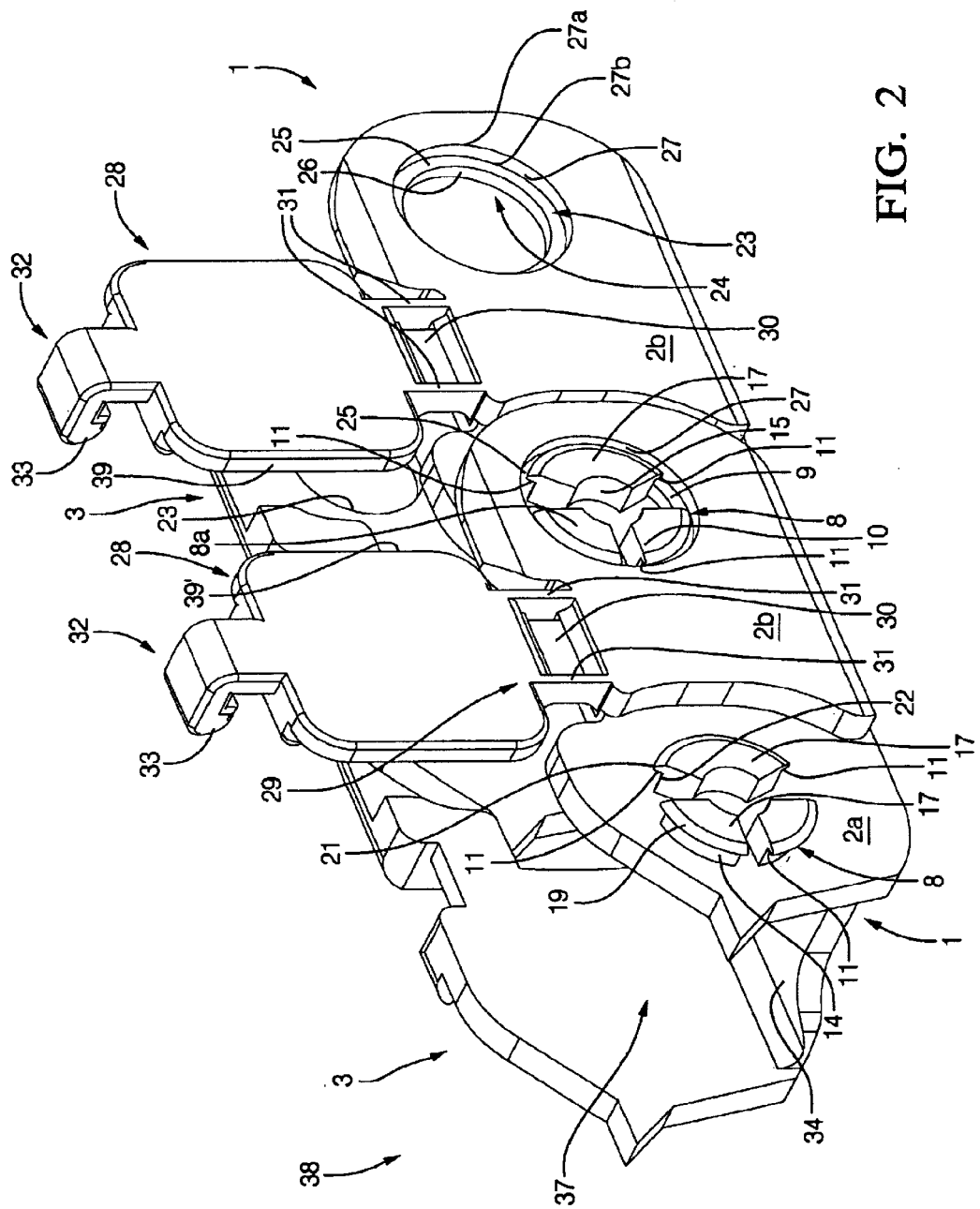
FIG. 2 is a perspective view of a portion of a chain within the scope of the present invention, wherein the chain portion contains chain links corresponding to the chain link of FIG. 1.

FIG. 1 illustrates a preferred embodiment of the chain link of this invention, and FIG. 2 shows a preferred embodiment of a portion of a cable carrier chain of this invention, the chain portion being composed of two chain links, each of the chain links being identical to the chain link shown in FIG. 1.

As shown in FIG. 1, the chain link, which is generally designated by reference numeral 1, includes first and second side plates 2, 3, which are laterally spaced from one another. Side plate 2 has a first end 4 and an opposite second end 5. Side plate 3 has a first end 6 and an opposite second end 7.

Preferably, first side plate 2 contains an inwardly offset section 2a and an outwardly offset section 2b, and second side plate 3 contains an inwardly offset section 3a and an outwardly offset section 3b. The extent of the offset between the inwardly offset section and the outwardly offset section of a side plate is preferably equal to the thickness of the side plate so that the outer faces of the inwardly offset sections all lie in alignment and the outer faces of the outwardly offset sections all lie in alignment in the chain.

Also preferably, side plates 2 and 3 are both one-part structures, with the inwardly and outwardly offset sections being integrally formed in the one-part structure.

Figure 3:
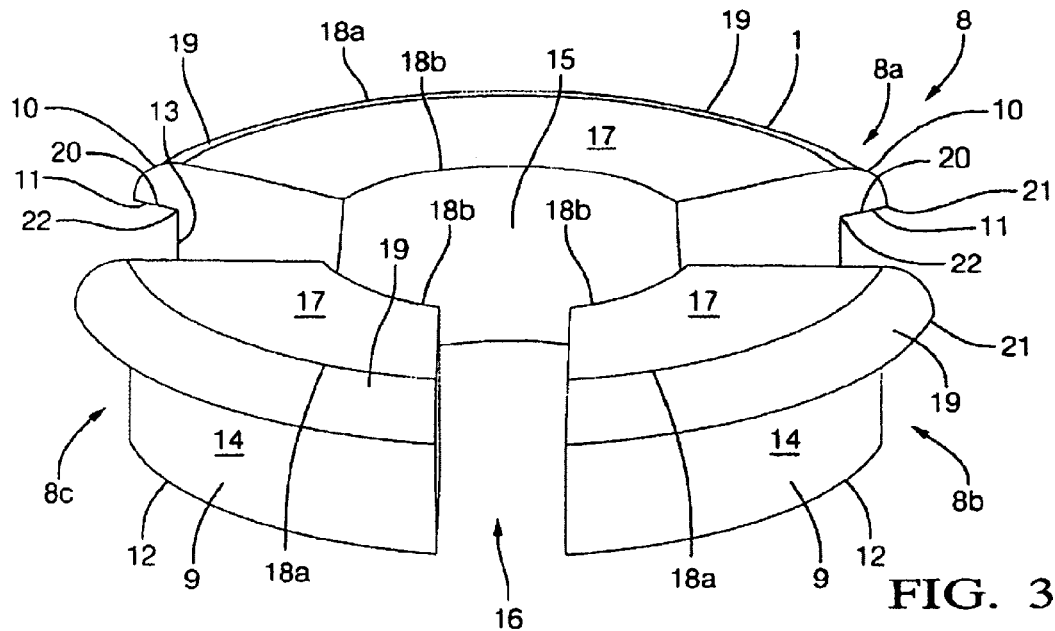
FIG. 3 is a close-up view of an undercut pin used in the chain links shown in FIGS. 1 and 2.

Chain link 1 further contains first and second undercut pins 8 disposed on the first and second side plates, respectively. Specifically, the first undercut pin is disposed on an outer surface of the first end 4 of side plate 2, and the second undercut pin (not shown) is disposed on an outer surface (not shown) of the first end 6 of side plate 3. Preferably, the first and second undercut pins are formed on outer surfaces of the inwardly offset sections of the side plates. The first and second undercut pins are preferably identical to one another and preferably axially aligned relative to one another. A detailed view of undercut pin 8 is shown in FIG. 3.

Each of the undercut pins 8 has a cylindrical shaft 9, an annular head 10, and a flat undercut-portion 11.

Shaft 9 preferably has a bottom end 12 attached to the side plate (preferably to an outer surface of the inwardly offset section of the side plate), a top end 13 joined to the bottom of head 10, an outer side wall 14, and an inner side wall 15. Preferably, pin 8 has formed centrally therethrough a cylindrically-shaped opening 16. Also preferably, pin 8 is subdivided into three symmetric sections 8a, 8b and 8c, each of which is attached to the side plate.

Head 10 preferably has a top surface 17 defined between an outer top circumferential edge 18a and an inner top circumferential edge 18b, a side surface 19, a bottom surface 20, and a bottom circumferential edge 21 disposed between the side surface and the bottom surface. Bottom circumferential edge 21 preferably defines the largest diameter of the head.

The flat undercut-portion 11 of the pin is preferably formed on bottom surface 20 of head 10 and defined between bottom circumferential edge 21 of head 10 and a top circumferential edge 22 of shaft 9. Preferably, undercut-portion 11 is disposed perpendicularly relative to outer side wall 14 of shaft 9.

Side surface 19 of head 10 is preferably an outwardly curved structure as shown in FIG. 3.

Chain link 1 also contains first and second round apertures 23, which are preferably identical and also preferably axially aligned relative to one another. The first and second apertures are formed in the second ends of the first and second side plates, respectively. Preferably, apertures 23 are formed in the outwardly offset sections of side plates 2 and 3.

Apertures 23 are each configured to receive an undercut pin 8 (see FIG. 2) of an adjacent identical chain link 1 (see FIG. 2).

Apertures 23 each contain an inner pin-retaining wall 24 which has a configuration that is complementary to the undercut pin. Wall 24 is also slightly oversized relative to the undercut pin. As used herein relative to wall 24 and the undercut pin, the term "slightly oversized" means that at any particular cross-section, the diameter of the aperture will be slightly larger than the diameter of the corresponding complementary portion of the pin such that the pin will be in slidable engagement with the aperture but will still be retained in the aperture. The degree to which the aperture diameter is oversized relative to the pin diameter will depend on the level of flexibility desired in the chain link and the chain composed of a plurality of such chain links. The greater the aperture diameter relative to the pin diameter, the more flexible the chain link and chain will be. The smaller the aperture diameter relative to the pin diameter, the less flexible the chain link and chain will be.

Pin-retaining wall 24 of the apertures contains a flat first retaining-surface 25 for slidable engagement with the undercut-portion 11 of the pin, an annular second retaining-surface 26 for slidable engagement with the shaft 9 (specifically with outer side wall 14 of shaft 9), of the pin, and an annular third retaining-surface 27 for slidable engagement with the head 10 (specifically, with the outer top circumferential edge 18a, the side surface 19 and the bottom circumferential edge 21) of the pin. Third retaining-surface 27 has a top circular edge 27a for slidable engagement with the top outer circumferential edge 18a of the head and a bottom circular edge 27b for slidable engagement with the bottom circumferential edge 21 of the head. Edges 27a and 27b define apertures of equal diameter.

The diameter of the aperture defined by second retaining-surface 26 is preferably slightly greater than the diameter of shaft 9 and smaller than the diameter of the bottom circumferential edge 21 of head 10. The flat retaining-surface 25 is preferably slightly wider than undercut-portion 11. The diameter of the aperture defined by the bottom circular edge 27b of the third retaining-surface 27 is preferably slightly greater than the diameter of the bottom circumferential edge 21 of head 10. The diameter of the aperture defined by the top circular edge 27a of the third retaining-surface 27 is preferably slightly greater than the diameter of the top outer circumferential edge 18a of the head and preferably slightly greater than the diameter of the bottom circumferential edge 21 of the head.

Chain link 1 also includes a hinged cover lid 28 disposed transversely between the first and second side plates 2 and 3. Lid 28 is fixedly attached to an upper longitudinal edge of one of the side plates 2, 3 and releasably attached to an upper longitudinal edge of the other side plate. Preferably, lid 28 is fixedly attached to an upper longitudinal edge of the outwardly offset section of one of the side plates and releasably attached to an upper longitudinal edge of the inwardly offset section of the other side plate.

Preferably, lid 28 is fixedly attached to the upper longitudinal edge of the outwardly offset section of the side plate by means of a dual-strap hinge member 29. A detailed view of hinge member 29 is shown in FIG. 4.

Figure 4:
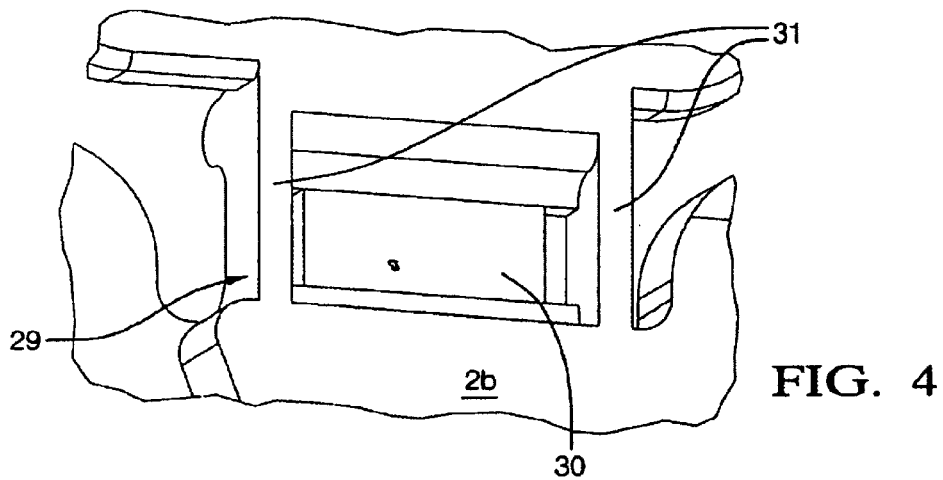
FIG. 4 is a close-up view of the dual strap hinge of the chain link shown in FIGS. 1 and 2.

As can be seen in FIGS. 1, 2 and 4, hinge member 29 has a horizontal primary hinge strap 30 and two vertical secondary hinge straps 31 disposed on opposite ends of strap 30. Hinge straps 31 are thicker than primary strap hinge 30.

Lid 28 is releasably attached to the side plate by means of an L-shaped member 32 having a hook-like end member 33 (preferably integrally formed therewith) for gripping the longitudinal edge of the side plate.

Figure 5:
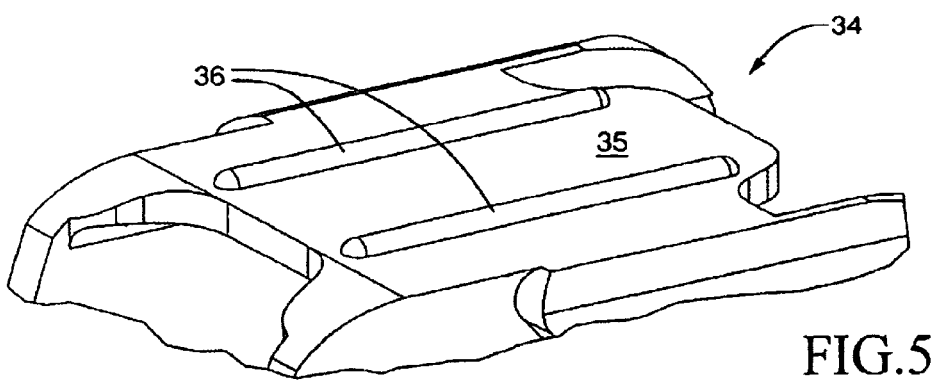
FIG. 5 is a close-up, perspective view of the track-linking side of a chain link within the scope of the present invention.

Chain link 1 further includes a bottom support plate 34 which connects side plates 2 and 3 to one another. Preferably, support plate 34 is integrally formed with side plates 2 and 3. A detailed view of support plate 34 is shown in FIG. 5.

In a preferred embodiment of this invention, support plate 34 has formed on a bottom surface 35 thereof a plurality of (preferably two) parallel ribs 36 which extend longitudinally along surface 35. Ribs 36 minimize points of contact between the chain links and the track upon which the links move during use and sit during rest. Thus, the ribs reduce the amount of noise created by the cable carrier chain by decreasing the link-to-track contact area. In addition, the ribs also serve as an anti-wear feature by reducing the effects of abrasion to the cable carrier chain itself and the vehicle due to door cycling and vehicle vibration.

Defined in each chain link 1 between inner surfaces of side plates 2 and 3, lid 28 and support plate 34 is a subchannel 37 (see FIG. 2) for receiving wires, cables or hoses (not shown)

The cable carrier chain of this invention is composed of a plurality of chain links 1 pivotally connected to one another in end-to-end fashion. A portion of a chain (designated generally by reference numeral 38) within the scope of this invention is illustrated in FIG. 2.

Chain portion 38 is composed of two chain links 1 (which are identical to one another) pivotally connected to one another in end-to-end fashion. The chain links are connected by placing the first and second undercut pins 8 of a first chain link into the first and second round apertures 23, respectively, of the adjacent chain link. Flat first retaining-surface 25 of pin-retaining wall 24 of the aperture slidably engages undercut-portion 11 of the adjacent pin, second retaining-surface 26 slidably engages the shaft 9 of the adjacent pin, and third retaining-surface 27 slidably engages the head 10 of the pin.

In the chain of this invention, lid 28 can function as a stop so as to limit the extent to which adjacent chain links swivel in relation to one another. As the chain is bent, a front edge 39 of lid 28 will enter an abutting relationship with a corresponding back edge 39' of the lid of the adjacent chain link (see FIG. 2), thereby preventing any additional bending of the chain along that pair of chain links.

The chain links, including the undercut pins, are preferably molded of synthetic resin, e.g., polyamide, polybutylene terephthalate, polyacetal, polypropylene, polyethylene, or the like engineering plastic.

The cable carrier chain of this invention is useful in guiding and protecting moving wires, cables and hoses on a wide range of machinery, non-limiting examples of which include, e.g., vehicles (e.g., automobiles), medical lab equipment, industrial robots, mobile and construction equipment, automated machinery, and the like.

The cable carrier chain of this invention is particularly suitable for use in automotive applications. The chain of this invention is especially useful as a component in sliding door systems found in many vehicles. An example of such a sliding door system is disclosed in U.S. Pat. No. 6,174,020, which is hereby incorporated by reference herein.

One skilled in the art will appreciate that the number of chain links 1 in chain 38 will vary in accordance with the use to which such chain is used.

What is claimed is:

1. A chain link for use in a cable carrier chain, comprising; (1) laterally spaced first and second side plates, each of the plates having a first end and an opposite second end; (2) first and second undercut pins disposed on outer surfaces of the first ends of the first and second side plates; (3) first and second round apertures formed in the second ends of the first and second side plates, respectively; (4) a hinged cover lid disposed transversely between the first and second side plates; and (5) a bottom support plate transversely connecting the first and second side plates to one another;

wherein each of the first and second undercut pins comprises a cylindrical shaft, an annular head, and a flat undercut-portion;

further wherein each of the first and second round apertures is configured to receive an undercut pin which is identical in configuration and dimension to the first or second undercut pin; each of the apertures comprising an inner pin-retaining wall having a configuration complementary to and slightly oversized relative to the undercut pin such that the pin is slidably retained within said aperture; the retaining wall comprising: a flat first retaining-surface for slidable engagement with the undercut-portion of the pin, an annular second retaining-surface for slidable engagement with the shaft of the pin, and an annular third retaining-surface for slidable engagement with the head of the pin; and further wherein the bottom support plate has formed on a bottom surface thereof a plurality of parallel ribs disposed longitudinally along said bottom surface.

2. A chain link according to claim 1, wherein the first and second undercut pins are axially aligned relative to one another, further wherein the first and second apertures are axially aligned relative to one another.

3. A chain link according to claim 1, wherein the head of each of the undercut pins comprises a top circumferential edge, a side surface, a bottom surface, and a bottom circumferential edge disposed between the side surface and the bottom surface, the bottom circumferential edge defining the largest diameter of the head; the shaft being attached to the bottom surface of the head; the flat undercut-portion being formed on the bottom surface of the head and being defined between the bottom circumferential edge of the head and a top circumferential edge of the shaft; further wherein the second retaining-surface of the pin-retaining wall of the aperture is shaped complementary to the shaft of the undercut pin, the flat retaining-surface of the pin-retaining wall is shaped complementary to the flat undercut-portion of the pin and the third retaining-surface of the pin-retaining wall is shaped complementary to the head of the pin, the third retaining-surface having a top circular edge and a bottom circular edge; wherein: the diameter of the aperture defined by the second retaining-surface is slightly greater than the diameter of the shaft and smaller than the diameter of the bottom circumferential edge of the head; the flat retaining-surface is slightly wider than the undercut-portion; the diameter of the aperture defined by the bottom circular edge of the third retaining-surface is slightly greater than the diameter of the bottom circumferential edge of the head; and the diameter of the aperture defined by the top circular edge of the third retaining-surface is slightly greater than the diameter of the top circumferential edge of the head and slightly greater than the diameter of the bottom circumferential edge of the head.

4. A chain link according to claim 1, wherein the first and second side plates each comprise an inwardly offset section and an outwardly offset section.

5. A chain link according to claim 4, wherein the first undercut pin is disposed on the inwardly offset section of the first side plate, the second undercut pin is disposed on the inwardly offset section of the second side plate, the first aperture is disposed on the outwardly offset section of the first side plate, and the second aperture is disposed on the outwardly offset section of the second side plate.

6. A chain link according to claim 1, wherein the hinged cover lid comprises a hinge member having a horizontal primary strap hinge and two vertical secondary hinge straps disposed on opposite ends of the primary hinge strap.

7. A chain link according to claim 6, wherein the secondary hinge straps are thicker than the primary hinge strap.

8. A chain link according to claim 1, wherein the bottom support plate has a pair of said parallel ribs formed on said bottom surface thereof.

9. A chain link for use in a cable carrier chain, comprising: (1) laterally spaced first and second side plates, each of the plates having a first end and an opposite second end, the plates each further comprising an inwardly offset section and an outwardly offset section; (2) axially aligned first and second undercut pins disposed on outer surfaces of the first ends of the first and second side plates, the first undercut pin being disposed on the inwardly offset section of the first side plate, the second undercut pin being disposed on the inwardly offset section of the second side plate; (3) axially aligned first and second round apertures formed in the second ends of the first and second side plates, respectively; the first aperture being disposed on the outwardly offset section of the first side plate, and the second aperture being disposed on the outwardly offset section of the second side plate; (4) a hinged cover lid disposed transversely between the first and second side plates; and (5) a bottom support plate transversely connecting the first and second side plates to one another;

wherein each of the first and second undercut pins comprises a cylindrical shaft, an annular head, and a flat undercut-portion; the head comprising a top circumferential edge, a side surface, a bottom surface, and a bottom circumferential edge disposed between the side surface and the bottom surface, the bottom circumferential edge defining the largest diameter of the head; the shaft being attached to the bottom surface of the head; the flat undercut-portion being formed on the bottom surface of the head and being defined between the bottom circumferential edge of the head and a top circumferential edge of the shaft;

further wherein each of the first and second round apertures is configured to receive an undercut pin which is identical in configuration and dimension to the first or second undercut pin; each of the apertures comprising an inner pin-retaining wall having a flat first retaining-surface which is complementary to the flat undercut-portion of the pin, an annular second retaining-surface which is complementary to the shaft of the undercut pin, and an annular third retaining-surface which is complementary to the head of the pin, the third retaining-surface having a top circular edge and a bottom circular edge; wherein: the diameter of the aperture defined by the second retaining-surface is slightly greater than the diameter of the shaft and smaller than the diameter of the bottom circumferential edge of the head; the flat retaining-surface is slightly wider than the undercut-portion; the diameter of the aperture defined by the bottom circular edge of the third retaining-surface is slightly greater than the diameter of the bottom circumferential edge of the head; and the diameter of the aperture defined by the top circular edge of the third retaining-surface is slightly greater than the diameter of the top circumferential edge of the head and slightly greater than the diameter of the bottom circumferential edge of the head;

further wherein the hinged cover lid comprises a hinge member having a horizontal primary strap hinge and two vertical secondary hinge straps disposed on opposite ends of the primary hinge strap, the secondary hinge straps being thicker than the primary hinge strap;

further wherein the bottom support plate has formed on a bottom surface thereof a pair of parallel ribs disposed longitudinally along said bottom surface.

10. A cable carrier chain, comprising a plurality of chain links pivotally connected in end-to-end fashion, each of the chain links comprising: (1) laterally spaced first and second side plates, each of the plates having a first end and an opposite second end; (2) first and second undercut pins disposed on outer surfaces of the first ends of the first and second side plates; (3) first and second round apertures formed in the second ends of the first and second side plates, respectively; (4) a hinged cover lid disposed transversely between the first and second side plates; and (5) a bottom support plate transversely connecting the first and second side plates to one another;

wherein, in each of the chain links, each of the first and second undercut pins comprises a cylindrical shaft, an annular head, and a flat undercut-portion; further wherein each of the first and second round apertures is configured to receive an undercut pin which is identical in configuration and dimension to the first or second undercut pin; each of the apertures comprising an inner pin-retaining wall having a configuration complementary to and slightly oversized relative to the undercut pin such that the pin is slidably retained within said aperture; the retaining wall comprising: a flat first retaining-surface for slidable engagement with the undercut-portion of the pin, an annular second retaining-surface for slidable engagement with the shaft of the pin, and an annular third retaining-surface for slidable engagement with the head of the pin;

further wherein, in said chain, the chain links are joined such that the first and second undercut pins of a middle chain link are mated to the first and second round apertures, respectively, of a first chain link adjacent to a first end of the middle chain link, and the first and second round apertures of the middle chain link are mated to the first and second undercut pins of a second chain link disposed adjacent to a second end of the middle chain link, the first end of the middle chain link being disposed proximate to the first ends of the first and second side plates of said middle chain link, and the second end of the middle chain link being disposed proximate to the second ends of the first and second side plates of said middle chain link; and further wherein, in each of said chain links, the bottom support plate has formed on a bottom surface thereof a plurality of parallel ribs disposed longitudinally along said bottom surface.

11. A chain according to claim 10, wherein, in each of said chain links, the first and second undercut pins are axially aligned relative to one another, further wherein the first and second apertures are axially aligned relative to one another.

12. A chain according to claim 11, wherein, in each of said chain links, the head of each of the undercut pins comprises a top circumferential edge, a side surface, a bottom surface, and a bottom circumferential edge disposed between the side surface and the bottom surface, the bottom circumferential edge defining the largest diameter of the head; the shaft being attached to the bottom surface of the head; the flat undercut-portion being formed on the bottom surface of the head and being defined between the bottom circumferential edge of the head and a top circumferential edge of the shaft; further wherein the second retaining-surface of the pin-retaining wall of the aperture is shaped complementary to the shaft of the undercut pin, the flat retaining-surface of the pin-retaining wall is shaped complementary to the flat undercut-portion of the pin and the third retaining-surface of the pin-retaining wall is shaped complementary to the head of the pin, the third retaining-surface having a top circular edge and a bottom circular edge;

wherein: the diameter of the aperture defined by the second retaining-surface is slightly greater than the diameter of the shaft and smaller than the diameter of the bottom circumferential edge of the head; the flat retaining-surface is slightly wider than the undercut-portion; the diameter of the aperture defined by the bottom circular edge of the third retaining-surface is slightly greater than the diameter of the bottom circumferential edge of the head; and the diameter of the aperture defined by the top circular edge of the third retaining-surface is slightly greater than the diameter of the top circumferential edge of the head and slightly greater than the diameter of the bottom circumferential edge of the head.

13. A chain according to claim 12, wherein, in each of said chain links, the first and second side plates each comprise an inwardly offset section and an outwardly offset section.

14. A chain according to claim 13, wherein, in each of said chain links, the first undercut pin is disposed on the inwardly offset section of the first side plate, the second undercut pin is disposed on the inwardly offset section of the second side plate, the first aperture is disposed on the outwardly offset section of the first side plate, and the second aperture is disposed on the outwardly offset section of the second side plate.

15. A chain according to claim 10, wherein, in each of said chain links, the hinged cover lid comprises a hinge member having a horizontal primary strap hinge and two vertical secondary hinge straps disposed on opposite ends of the primary hinge strap.

16. A chain according to claim 15, wherein, in each of said chain links, the secondary hinge straps are thicker than the primary hinge strap.

17. A chain according to claim 10, wherein, in each of said chain links, the bottom support plate has a pair of said parallel ribs formed on said bottom surface thereof.

18. A chain according to claim 10, wherein each of said chain links comprises: (1) laterally spaced first and second side plates, each of the plates having a first end and an opposite second end, the plates each further comprising an inwardly offset section and an outwardly offset section; (2) axially aligned first and second undercut pins disposed on outer surfaces of the first ends of the first and second side plates, the first undercut pin being disposed on the inwardly offset section of the first side plate, the second undercut pin being disposed on the inwardly offset section of the second side plate; (3) axially aligned first and second round apertures formed in the second ends of the first and second side plates, respectively; the first aperture being disposed on the outwardly offset section of the first side plate, and the second aperture being disposed on the outwardly offset section of the second side plate; (4) a hinged cover lid disposed transversely between the first and second side plates; and (5) a bottom support plate transversely connecting the first and second side plates to one another;

wherein each of the first and second undercut pins comprises a cylindrical shaft, an annular head, and a flat undercut-portion; the head comprising a top circumferential edge, a side surface, a bottom surface, and a bottom circumferential edge disposed between the side surface and the bottom surface, the bottom circumferential edge defining the largest diameter of the head; the shaft being attached to the bottom surface of the head; the flat undercut-portion being formed on the bottom surface of the head and being defined between the bottom circumferential edge of the head and a top circumferential edge of the shaft;

further wherein each of the first and second round apertures is configured to receive an undercut pin which is identical in configuration and dimension to the first or second undercut pin; each of the apertures comprising an inner pin-retaining wall having a flat first retaining-surface which is complementary to the flat undercut-portion of the pin, an annular second retaining-surface which is complementary to the shaft of the undercut pin, and an annular third retaining-surface which is complementary to the head of the pin, the third retaining-surface having a top circular edge and a bottom circular edge; wherein: the diameter of the aperture defined by the second retaining-surface is slightly greater than the diameter of the shaft and smaller than the diameter of the bottom circumferential edge of the head; the flat retaining-surface is slightly wider than the undercut-portion; the diameter of the aperture defined by the bottom circular edge of the third retaining-surface is slightly greater than the diameter of the bottom circumferential edge of the head; and the diameter of the aperture defined by the top circular edge of the third retaining-surface is slightly greater than the diameter of the top circumferential edge of the head and slightly greater than the diameter of the bottom circumferential edge of the head;

further wherein the hinged cover lid comprises a hinge member having a horizontal primary strap hinge and two vertical secondary hinge straps disposed on opposite ends of the primary hinge strap, the secondary hinge straps being thicker than the primary hinge strap.

* * * * *